US007229819B1

(12) United States Patent
Cheng et al.

(10) Patent No.: US 7,229,819 B1
(45) Date of Patent: Jun. 12, 2007

(54) NON-CORROSIVE, NON-CAUSTIC, NON-FLAMMABLE, CATALYST-BASED DECONTAMINANT FORMULATION

(75) Inventors: Tu-Chen Cheng, Timonium, MD (US); Joseph J. DeFrank, Bel Air, MD (US); Steven P. Harvey, Fallston, MD (US); Vipin K. Rastogi, Bel Air, MD (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 372 days.

(21) Appl. No.: 10/694,206

(22) Filed: Oct. 27, 2003

(51) Int. Cl.

| | |
|---|---|
| ***A62D 3/00*** | (2006.01) |
| ***C02F 3/34*** | (2006.01) |
| ***D06M 16/00*** | (2006.01) |

(52) U.S. Cl. .................... 435/264; 435/262; 435/262.5

(58) Field of Classification Search ..................... None
See application file for complete search history.

(56) References Cited

U.S. PATENT DOCUMENTS 5,169,554 A * 12/1992 Akkara et al. .............. 510/110
5,616,498 A * 4/1997 Favre-Bulle et al. ........ 435/264
6,897,032 B1 * 5/2005 Elashvili ...................... 435/18
6,922,615 B2 * 7/2005 Pillar et al. .................... 701/1

* cited by examiner

*Primary Examiner*—David M Naff
*Assistant Examiner*—Deborah K. Ware
(74) *Attorney, Agent, or Firm*—Ulysses John Biffoni

(57) ABSTRACT

The present invention relates to a near-universal non-corrosive, non-toxic, environmentally safe and user friendly decontaminant capable of detoxifying organophosphorus (OP)-based G-type, V-type neurotoxic chemical warfare, sulfur-mustard, and related OP based hazardous industrial materials in a dry powder form. The decontaminant contains OPH enzyme, OPAA enzyme, DFPase enzyme, dehalogenase enzyme, quaternary ammonium salt, a pH control reagent, a fire-fighting agent, and a foaming agent. The decontaminant is mixed with available water for use.

12 Claims, No Drawings

NON-CORROSIVE, NON-CAUSTIC, NON-FLAMMABLE, CATALYST-BASED DECONTAMINANT FORMULATION

GOVERNMENT INTEREST

The invention described herein may be manufactured, used and licensed by or for the U.S. Government.

BACKGROUND OF THE INVENTION

1. Field of the Invention

The present invention relates to a near-universal non-corrosive, non-toxic, environmentally safe and user friendly decontaminant in a dry powder form capable of detoxifying organophosphorus-based G-type, V-type neurotoxic chemical warfare, sulfur-mustard, and related organophosphorus based hazardous industrial materials.

2. Brief Description of Related Art

Risk of exposure from chemical biological warfare (CBW) agents to men and women in uniform engaged in conflicts around the world has long been realized. Since the tragic events of Sep. 11, 2001, use of CBW materials by terrorist or extremist groups against the civilian population has become a real and credible threat. Even though the high toxicity of CBW agents of military significance (G-type, V-type and sulfur-mustard) are well documented, a number of other organophosphorus (OP) based agricultural pesticides and related industrial toxic chemicals are relatively easy to synthesize, procure, and intentional use of these hazardous materials pose significant threat in Homeland Defense arena.

Decontamination is defined as the process of removing or neutralizing a surface hazard resulting from a CBW threat agent attack. The key goal is to quickly restore battlefield operational tempo and logistics after a CB attack has occurred. The CBW agents require cumbersome protective measures causing significant compromise of the combat performance. Thus, decontamination capabilities are required to sustain operations in a CB contaminated environment, to ensure power projection capabilities, to clean up personnel and large areas for retrograde and re-supply operations, and to reconstitute individual equipment, vehicles, and weapon platforms (Joint Science and Technology Panel for Chemical and Biological Decontamination, DOD).

The objective of our decontamination technology advancement efforts was to develop systems that are rapid and effective in detoxifying CBW agents, environmentally safe, do not impact the effectiveness of the equipment being decontaminated, and minimize the logistical impact on operations.

In addition to the traditional concept of dealing only with vehicles and equipment, it is also crucial to be able to decontaminate large areas such as logistics bases, air-fields, ports, key command and control centers, and other fixed-site facilities. With the rising threat of terrorist attacks using CB agents or toxic industrial chemicals, decontamination of large civilian facilities is a major concern as well.

Current simple chemistry-driven decontaminants are caustic and have the potential for causing materiel and environmental damage and personnel injury. This and the fact that some are decontaminant materials flammable also have made them inappropriate for the following uses: shipboard, high performance aircraft, other non-hardened equipment or on personnel. In addition, most are bulk liquids that require significant logistics and storage capabilities. While some of these decontaminants are non-aqueous, they still require considerable amounts of water for pre-washing and post-application rinsing to prevent corrosion of the equipment. These realities further impinge on their applicability in dealing with indoor facilities or large outdoor fixed sites that have been contaminated.

DS2 (Decontamination solution 2) is the currently fielded Department of Defense (DOD) decontaminant. It is effective against a broad range of CB threat material. However, DS2 is highly corrosive and poses serious environmental and user-safety concerns. A number of other decontamination alternatives, e.g. DECON GREEN (Edgewood Research Center) and DF200 (Sandia National Labs) have been in development for a number of years. Both these decontaminants contain significant amounts of organic solvents and hydrogen peroxide. The flammable nature has rendered use of these decontaminants inappropriate in certain critical situations: shipboard; on new, high performance aircraft; on other non-hardened equipment and/or on personnel. The bulk amounts (stoichiometric) component liquids—also require significant logistics and storage burden.

There is, therefore, a need for a decontaminant that has the following characteristics:

a. Effective-against broad-spectrum C/B warfare agents, hazardous agricultural and industrial toxic material;

b. Non-corrosive, nontoxic, and non-flammable;

c. User friendly;

d. No adverse environmental impact;

e. Minimal logistical storage and shipping burden;

f. Minimal impact on indoor surfaces and materials;

g. No post clean-up hazardous waste;

h. Ease of application with existing spray and fire-fighting equipment.

The key objective of the present invention is to provide a decontaminant that is non-corrosive, non-toxic, environmentally-safe and user friendly capable of detoxifying neurotoxic organophosphorus (OP)-based G-type and V-type agents, sulfur-mustard, and OP-based hazardous industrial pesticides not just for large-area, but also for: suppressing fires, skin surface or personnel decontamination, use in laundry detergent and soap, degreasing operations, protective barriers such as filter and skin cream/lotions, and personnel decontamination.

These objectives of the invention will become more apparent in succeeding sections of the disclosure.

SUMMARY OF THE INVENTION

The present invention is directed to a dry powder of near universal decontaminant formulation that contains a) recombinant OPH (organophosphorus hydrolase), OPAA (organophosphorus acid anhydrolase), DFPase (diisopropyl fluorophosphatase), and a dehalogenase enzyme, b) quaternary ammonium salts, c) pH control reagent, d) foaming agent, and e) fire fighting agent. It is effective against G-type agents, V-type agents, mustard gas and a host of other OP-based pesticides.

DETAILED DESCRIPTION

The present invention details a decontaminant formulation containing CW agent detoxifying enzymes. An appropriate mixture of enzymes offers considerable advantages over other decontaminants. Being catalytic, the enzymes are highly efficient and can detoxify many times their own weight of agent in seconds or minutes. The three primary enzymes intended for use in the proposed formulation of the present invention are two bacterial enzymes, (OPH and OPAA) and a squid nerve enzyme (DFPase). These biocatalysts, OPH, OPAA and DFPase, are capable of detoxifying G-type agents and CW surrogates (all three), OP-pesticides (OPH), and V-type agent (OPH). Table 1 lists the catalytic activity of the enzymes against various chemical agents, and their original source contemplated by the present invention.

TABLE 1

Nerve Agent Detoxifying Enzymes

| Enzyme | Original Source | Molecular Weight (kD) | Agent Decontamination Activity |
|---|---|---|---|
| Organo-phosphorus Hydrolase (OPH) | *Pseudomonas diminuta* and *Flavobacterium* | 72 | DFP > GF ≈ GB > GD > VX |
| Organo-phosphorus Acid Anhydrolase (OPAA) | *Alteromonas* sp. JD6.5 | 58 | GD > GF ≈ DFP > GB > GA |
| Diisopropyl-fluorophos-phatase (DFPase) | Squid *Loligo vulgaris* | 35 | DFP > GF ≈ GB > GD > GA |

The OPH is an enzyme found in a number of bacterial isolates that has optimal activity against a variety of OP pesticides (originally called parathion hydrolase) in addition to its activity against CW nerve agents. While many researchers have studied OPH, the primary information on its structure and mode of activity has come from the laboratories of Frank Raushel and James Wild, both of Texas A&M University. The gene for this enzyme has been cloned, sequenced, and expressed in a number of prokaryotic and eukaryotic host organisms. The three-dimensional crystal structure of OPH also has been determined revealing that the native enzyme is a homodimer containing two $Zn^{2+}$ ions per subunit. The $Co^{2+}$ substituted enzyme has greater activity on nerve agents and substrates with P—F and P—S bonds (Omburo et al., 1992). OPH is the only well characterized enzyme with catalytic activity against V-agents. Although several orders of magnitude slower than its paraoxon hydrolyzing activity, the V-agent activity is significant and has been improved by an order of magnitude through site-directed mutagensis carried out recently by several laboratories. While more research has been conducted on OPH compared to other chemical agent-degrading enzymes, its cellular function and native substrate remain unknown. The recombinant OPH enzyme with high level production is purified and prepared through cloning in an expression vector within *Escherichia coli* host by Rastogi/Cheng/DeFrank (see U.S. Pat. No. 6,469,145: Rastogi, Cheng, and DeFrank), incorporated herein by reference in its entirety. It has been licensed to Genencor International (NY) for production.

U.S. Pat. No. 6,469,145, relating to construction of a recombinant clone expressing OPH, a simple one step purification process for purifying OH enzyme, and stabilization of lyophilized OPH enzyme is incorporated herein in its entirety by reference.

The OPAA enzyme, originally identified in the obligate halophilic bacterium *Alteromonas* sp. JD6.5, was isolated from Grantsville Warm Springs in Utah (DeFrank and Cheng, 1991). Unlike OPH, OPAA has its best activity against G-type CW agents and very little activity against pesticides. The gene encoding OPAA has been cloned, sequenced, and expressed at very high levels in *Escherichia coli* (up to 50% of cell protein). The enzyme can be freeze-dried and the freeze-dried enzyme retained catalytic activity for over four years, when stored at room temperature. Crystalization studies were conducted in the laboratory of Florante Quiocho, Baylor College of Medicine, and the three-dimensional structure is being determined (unpublished results). From the amino acid sequence and functional studies on a variety of dipeptides, the OPAA was identified as an X-Pro dipeptidase (or prolidase, EC 3.4.13.9). From the examination of a model of the active site of OPAA (based on sequences of other prolidases and peptidases), it was apparent that soman fits just as well as the X-Pro dipeptide such as Leu-Pro. Through serendipity, it is ideally positioned for hydrolytic attack on the phosphorus atom. This class of enzymes can be found throughout nature in organisms as primitive and diverse as Archea, bacteria, and humans. The OPAA is likely to be found in all organisms as part of their protein turnover system. Several X-Pro dipeptidases from different organisms have been examined and all possess activity against G-type CW agents, but at a level much less than that of A. sp.JD6.5 OPAA. OPAA does not have activity against V-agents, but with the three-dimension structure now determined, site-directed mutagensis can be undertaken to explore the possibility of VX hydrolysis by OPAA. Kinetic studies have shown that VX inhibits the OPAA enzyme in a manner best modeled as competitive, strongly suggesting that VX does enter or bind in the active site even if it is not a substrate (Harvey, et al., 2000). The recombinant OPAA was prepared by the procedures set forth in U.S. Pat. Nos. 5,928,927 and 6,080,566, incorporated herein in their entirety by reference, OPAA also has been licensed to Genencor International for commercial production.

U.S. Pat. No. 5,928,927 relates to the DNA sequence of OPAA gene, protein sequence, and a bacterial clone containing the recombinant plasmid, and clone producing the OPAA enzyme.

U.S. Pat. No. 6,080,566 relates to OPAA assay composition, use of OPAA in different carriers such as foams, degreasers, wetting agents, lyophilization for producing powder enzyme, and method for degrading OP compounds, including G-type agents.

Of the three CWA agent-degrading enzymes, the squid DFPase has been studied for the longest period. First identified by Francis Hoskin in 1966, it was given the name DFPase in 1969 (Hoskin, 1969). More recently, extensive research has been conducted in the laboratory of Prof. Heinz Ruterjans, University of Frankfurt. The gene for the squid enzyme has been cloned, sequenced, and expressed both in *E. coli* and the yeast *Pichia pastoris* (Hartlieb and Ruterjans, 2001). The squid-type DFPase has been found only in cephalopods, requires $Ca^{2+}$ for activity and stability, and hydrolyzes DFP five times faster than soman. Its biochemical properties are completely different from those of OPH and OPAA. To this day, it still appears to belong to a unique class of enzymes.

Unlike most chemical catalysts, enzymes with different properties and specificities can be mixed together in a single formulation. This takes advantage of their different activities and properties to provide as broad of coverage as possible when used as a single formulation. For example, if one of the enzymes is inhibited by presence of a certain metal, the other enzymes in the formulation with overlapping activity on the same substrate may be either stimulated or unaffected. This will ensure that irrespective of the quality of water used, requisite amount of active enzymes is always available for detoxifying the CW agents. In addition, since the recommended set of enzymes function efficiently at pH values around neutrality, there are few, if any compatibility or corrosion concerns as long as the material being decontaminated can tolerate water.

Availability of CW-degrading enzymes in large quantities and their stability at ambient temperatures are two critical requirements in development of the enzyme-based decontaminant. Lyophilized recombinant DFPase is currently produced by Roche Company (Basel, Switzerland) and is available in North America through BioCatalytics Inc. (Pasadena, Calif.). Both recombinant OPH and OPAA enzymes are available commercially and are in the process of being commercialized for large-scale production by Genencor International Co. (Rochester, N.Y.).

In general, the aqueous preparations of enzymes are labile to temperature and organic solvents, and are known to decay over a relatively short period of time at ambient temperatures. We have achieved long-term (over four years) stability of the recombinant enzymes, OPH, OPAA and DFPase in the dry powder form. Storage of lyophilized enzymes at room temperatures resulted in no loss in catalytic performance against CW threat materials and their surrogates. The recombinant enzyme solutions of OPAA and OPH were lyophilized in the presence of 250 mM trehalose.

Incorporation of Nerve Agent Degrading Enzyme in Water Based System

The CW agent-degrading enzymes are capable of functioning in a variety of water-based systems. (Cheng et al., 1998) Performance of CW-degrading enzymes, OPH, OPAA and DFPase was tested in a variety of fire-fighting foams, degreasers, laundry detergent, skin lotion, and other matrices. The results show that enzymes retained significant levels of hydrolytic activities against CW surrogates in these matrices.

For example, the catalytic activity of OPAA in the presence of several water-soluble and biodegradable commercial agents, degreasers, and foams for detoxification of G-agent simulant, DFP (diisopropylfluorophosphate) was tested and is summarized in Table 2. The enzyme activity was enhanced in the presence of ColdFire®, Odor Seal®, Tide-Free®, and CORNsolv® formulations. The full enzyme activity retained in the presence of Fire Choke. The enzyme was also quite active in other fire-fighting agents, AFC-380®, BioSolve®, and BV 406LF®. The incorporation of these biodegradable matrices with the enzyme decontamination system not only provides a medium to encapsulate the CW agents, but also assists in solubilization of the agents for enzyme action. OPH and DFPase were tested in various matrices and retained good activity as well.

TABLE 2

OPAA Activity in Various Matrices

| Vehicle | Property | Conc. Used (%) | Relative Activity |
|---|---|---|---|
| Control ($NH_4CO_3$ buffer, pH 8.7) | — | — | 100 |
| AFC-380 (Sandia National Lab: Albuquerque, NM) | Blast containment | 6 | 54 |
| BioSolve (Westford, MA) | Fire-fighting wetting agent | 6 | 53 |
| Fire Choke (Fire Response: Houston, TX) | Class A firefighting foam | 0.5 | 100 |
| BV 406LF (Fire Freeze: Rockaway, NJ) | Degreaser/cleaner | 10 | 73 |
| ColdFire (Fire Freeze: Rockaway, NJ) | Fire-suppressing | 10 | 120 |
| Odor Seal (FireFreeze: Rockaway, NJ) | Odor removing | 10 | 102 |
| Tide Free (Proctor and Gamble) | Laundry detergent | 0.05 | 108 |
| CORNsolv (SOYsolv: Tiffin, OH) | Biodegradable solvent | 1 | 121 |

Similar to commercial laundry detergents containing different enzymes, an enzyme-based decontaminant will pose little or no health or environmental danger and will result in no hazardous products requiring cleanup. Another major advantage is that an enzyme-based decontaminant would be provided as a dry powder that can be added to any available water-based spray or foam systems available to the user. This provides a significant reduction in the logistical burden (25-50 fold) as well as making use of existing equipment, both military and civilian. For example, to provide two million gallons of decontaminant for a major military engagement would require 11,000 tons of DS2. On the other hand, the equivalent amount of dry, enzyme-based decontaminant would weigh ~56 tons and have no special storage or transportation requirements. This reduction in logistics burden is especially important for ships at sea. For example, when added to an aircraft carrier's Countermeasure Washdown System, less than 500 pounds of enzymes-based decontaminant would be required to treat the entire flight deck (1092×257 ft, ~200,000 $ft^2$, 4.5 acres) with 3" of foam.

While the enzyme-based system is aqueous, the overall result is actually reduction of the water usage and simplification of the decontamination operations. A primary goal is to use whatever water is available locally. In fact, the amount of water used with the enzyme-based system will be less than that required with DS2. For example, under current decontamination protocols for an M1A1/M1A2 Abrams tank (120 $m^2$), the following materials are required: 320 gallons of water for prewash, 15 gallons of DS2 for thorough decon and 80 gallons of water for rinse. With an enzyme-based system of the present invention, the pre-wash (to remove bulk agent) would also contain enzymes, thus decontamination begins as soon as the threat material is removed from the contaminated surfaces. Because of the non-corrosive nature of the enzyme-based system, the rinse steps may be eliminated.

Mustard Challenge:

A major limiting factor in the development of an enzyme-based decontaminant has been the problem of dealing with sulfur mustard (HD: 2,2'-dichloroethylsulfide). Because it is essentially insoluble in water, making it unavailable to the aqueous hydrolytic enzymes is a significant challenge. Once mustard is solubilized, its spontaneous hydrolysis rate to form the non-toxic thiodiglycol (TDG) is quite rapid. Therefore, many approaches have been examined to accomplish this goal. Several detergents have been tested to determine their effects on mustard hydrolysis and all were found to significantly inhibit hydrolysis (Harvey, 1999). In chemistry-based decontaminants, the most common method of dealing with mustard is through oxidation to sulfoxide. Mustard sulfoxide is no longer a vesicant although it does retain systemic toxicity. If the oxidation is continued, the sulfoxide is converted to the sulfone, which again causes severe blistering.

Quaternary Ammonium Compounds

Several commercially available quaternary ammonium compounds resulted in significant enhancement in the mustard hydrolysis rate. One such compound, dodecyldimethyl (3-sulfopropyl) ammonium hydroxide (DDSAH; from Aldrich, Wis.) acts as a phase transfer catalyst. It not only increased the rate of mustard hydrolysis but was also shown to be compatible with OPH, OPAA and DFPase enzymes. The DDSAH possessed biocidal activity towards germinating spores and vegetative cells of *Bacillus anthracis* and was shown to enhance the activity of OPAA and OPH against G-type CW agents. DDSAH is used in an amount of 0.5-1.0 mg/ml and is commercially available from Aldrich Chemical Co.

Dehalogenase Enzymes

The search for enzymes capable of dechlorinating mustard and other chlorinated alkanes was pursued. A *Rodococcus* dehalogenase enzyme (HD hydrolase) with this ability was recently identified and shown to significantly enhance the hydrolysis rate of mustard even in the absence of any solvent (Harvey, 2001). One explanation for the enzyme's ability to deal with insoluble substrates may be due to the presence of hydrophobic amino acids around its active site. This could also explain its interaction with mustard.

BW Agents

A variety of approaches were used in dealing with the decontamination of BW agents. Several of the planned, non-enzymatic components of the proposed system (DDSAH and ColdFire®) have been shown to give significant killing of non-pathogenic *B. anthracis* cells and other stimulants. Enzymes that may be incorporated into the formulation will include those commercially available such as lysozyme as well as others that are currently under development. Some of these are oxidative fungal enzymes currently under development by Novozymes A/S (Bagsvaerd, Denmark) with activity against both cells and spores.

Other natural products with biocidal activity such as plant essential oils, and biosurfactants can be used as additives. They are available from commercial sources. Many of these materials are already approved food additives. By incorporating a variety of these materials in the formulation, a greater degree of BW agent decontamination can be achieved.

The dual-use, catalyst-based decontaminant containing fire-fighting material of the invention is also referred to as the Advanced Catalytic Enzyme System (ACES). The initial formulation of ACES will consist of the following components:

Decontamination of CW Agents and Pesticides

Organophosphorus acid anhydrolase (OPAA)—(Cheng and DeFrank, 1999, 2000)

Organophosphorus hydrolase (OPH)—(Rastogi et al., 1997)

Recombinant DFPase from squid (from BioCatalytics) (Hartlieb and Rüterjans, 2001)

Decontamination of Sulfur Mustard

Bacterial HD hydrolase (Harvey, 2001)

DDSAH (Harvey, 1999) Dedecyldimethyl (3-sulfopropyl) ammonium hydroxide

Decontamination of BW Agents

Haloperoxidase and their mutants from fungal strains (Novozymes).

Lysozyme (commercial)

Buffering

Ammonium carbonate. (Sigma Chemical Co., MO) (5-25 g/L)

Fire-Fighting Components

ColdFire® (from FireFreeze Worldwide) (3 g/L)

Fire Choke® (from Fire Response Systems) (0.1 g/L) or an equivalent Class A foam (optional additives)

The packaging of ACES from this invention would be in sizes that will conform to the types of equipment in which it will be used. This could range from one-ounce packets for spray container, which individual war-fighter/first responder could carry, up to 50-pound pails for use with large pumping systems, or other fire-fighting equipments.

Commercial production of OPAA and OPH is carried out through ECBC/Genencor collaboration.

TABLE 3

Enzyme Decon Tests/Decontamination of CW Agents by Enzymes in the Advanced Catalytic Enzyme System

| | | | | Decontamination Efficacy of Plate (%) at time intervals | | | |
|---|---|---|---|---|---|---|---|
| Year | Enzyme | Agent | Surface | 15 | 20 | 30 | 40 (min) |
| 1997 (FR) | OPAA (CF) | GD | PU | 99.9 | | >99.9 | |
| | DFPase (Silv-EX) | GD | PU | >99.9 | | >99.9 | |
| | OPAA (Silv EX) | GD | PU | >99.9 | | >99.9 | |
| 1998 (FR) | OPAA (CF + SilvEX) | GD | PU | 99.3 | | 99.7 | |
| | DFPase (buffer) | GD | PU | 99.6 | | 99.6 | |
| 1999 (FR) | OPH (CF) | VX | PU | | >99.9 | | >99.9 |
| | OPAA (Tide) | GD | PU | 99.6 | | 99.7 | |
| 1999 (GE) | OPAA (UK µEmul) | GD | Alkyd 3 Hr. | >99.9 | | >99.9 | |
| 2000 (UK) | OPAA (UK µEmul) | TGD | PU 1 Hr. | | | 99.7 | |
| | OPAA (CF) | TGD | PU 1 Hr. | | | 99.7 | |
| 2002 (FR) | DFPase in Eco-Foam | GD | PU | >99.9 | | >99.9 | |

CF = ColdFire; Eco-Foam = fire-fighting foam; GD = Soman; µEmul = microemulsion; PU = polyurethane plate coupon; Silv EX = fire-fighting foam; TGD = thickened soman Table 3 demonstrates the efficacy of enzyme-based decontamination formulation in removing CW agents from painted metal surfaces representing standard military equipment. The test consisted of applying the chemical agent (in 1-2 µL drops) on the painted plates at a loading level of 10-g/m$^2$. The plates were then incubated in a close chamber to permit absorption into paint. The time of incubation ranged from 30 minutes in France (FR), to 1 hour in the United Kingdom (UK) to 3 hours in Germany (GE). The plates were then placed on a test stand where they were sprayed with the decontaminant for 5-10 seconds. At various times, plates were removed and remaining agent extracted with methylene chloride. The amount of agent in the extract was determined by gas chromatographic procedures certified by the test laboratory.

In the results shown, the OPAA and OPH enzymes were provided as lyophilized powders (and ammonium carbonate as powder) and dissolved in the water just prior to use. The DFPase was provided as a liquid concentrate and mixed with either buffer or Eco-Foam solutions prior to application.

The enzyme levels were generally within the ranges given in Table 4.

TABLE 4

Formulation Table for the Advanced Catalytic Enzyme System of the Invention

| Ingredient | Amount gram/L | Preferred Amount |
|---|---|---|
| OPH | 0.1-0.5 | 0.5 |
| OPAA | 0.01-0.05 | 0.02 |
| DFPase | 0.01-0.05 | 0.02 |
| Dehalogenase enzyme HD dehalogenase | 1 | 1 |
| Quaternary ammonium Salt | 0.5-1.0 | 1 |
| pH control agent Ammonium carbonate | 5-25 | 8.5 |
| Fire fighting/Foaming agent | 0.1 | 0.1 |
| Fire fighting agent Cold Fire (Fire-freeze, Rockaway, NJ) | 3 | 3 |

All components in Table 4 were added as fine-to-small granulated (<5 mm in size) powder. The indicated range of enzymes is based on equivalent protein amount. Ammonium carbonate is used at 5-g/L concentration for most personnel decontamination purposes, however, 25-g/L are needed if 2% chemical agent needs to be decontaminated. For personnel decontamination alone, the 5-g/L would be used. For all other or general decontamination use, the 25-g/L would be used.

Regarding Table 4, ColdFire is an enzyme stabilization/fire fighting agent. The amount of OPAA is an optimal amount useful for decontaminating G-agents. A 2% agent (GB, GD) could be decontaminated within 15 min with 0.01-0.05 OPAA. OPH is used in an amount of 0.1-0.5 for pesticides, G-agents, and V-agents. A 2% agent VX, could be decontaminated within 1 hour by 0.5-g/L OPH, however, significantly less time (within 15 min) would detoxify pesticides and G agents. HD dehalogenase results in 2-fold increase in the rate of mustard decontamination.

TABLE 5

Advanced Catalytic Enzyme System - ACES Optional Additives

| Components | % (W/V) |
|---|---|
| Fire fighting foams for use in wide range applications | 0.1-0.3 |
| Fire Choke ® (Fire Response: Houston, TX) | 1.0-5.0 |
| Hawk ® (Hawk International, Gig Harbour, WA) | |
| Disinfectants for BW Decontamination | 80-90 |
| Biocidal ZF (Wak-Chemie: Germany) | 80-90 |
| EcoTru ® (EnviroSystems: San Jose, CA) | |
| Aqueous detergents, odor removal, and solvents (Laundry | 0.02-0.1 |
| detergent, hand washing, and cleaning solutions) | 0.1-0.5 |
| Tide Free ® (P & G, Cincinnati, OH) | 5-15 |
| Dawn ® Detergent (P & G, Cincinnati, OH) | 1.0-3.0 |
| Odor Seal ® (FireFreeze, Rockaway, NJ) | |
| CornSolv ® (SoySolv, Tiffin, OH) | |

Fire Choke® is available as a powder, as is Tide Free laundry detergent. The remaining components are used as a liquid concentrate, which is added after the powder is dissolved.

The complete formulation of the catalytic decontamination system was optimized with respect to buffering agent requirement, detoxification performance, and foaming abilities. Unlike most chemical catalysts, enzymes with different properties and specificities can be mixed together in a single formulation. This takes advantage of their different activities and properties to provide as broad coverage as possible when in use. For example, if a certain metal inhibits any one enzyme, other enzymes in the formulation with activity on the same substrate may be either stimulated or unaffected by it. This will ensure that no matter the type or quality of water used, enough of the various enzymes will be functioning to provide the necessary coverage. In addition, since most enzymes function best at pH values near neutrality, there are few, if any, compatibility or corrosion concerns as long as the material being decontaminated can tolerate water. Similar to OPAA and OPH, dehalogenase powder also can be prepared in the presence of trehalose. Other dried ingredients [ammonium carbonate, quaternary ammonium salt, firefighting agent (FireFreeze, Rockaway, N.J.) and foaming agent (Fire choke; Fire Response: Houston, Tex.); Table 4] can be packed with enzyme powders in either sealed plastic bag or other containers (tube, bottle). These dried enzyme powders/ingredients are quite stable when store at room temperature. Based on the amount shown in Table 4, the enzyme powders and dried ingredients can be dissolved and mixed in any water sources (deionized, tap, pond, river, or sea water) inside the spray or decontamination apparatus just prior to use. If other optional ingredients are available in liquid form, they can be added during this mixing step.

A complete formulation will be used for equipment/gear cleanup and washing/cleaning of clothing/tent. Optional additive (Table 5) will include aqueous detergents such as Tide Free® or Dawns detergent. The use of the formulation in this operation will not result in any hazardous waste discharge.

Fire-Fighting Capabilities

The ACES of the invention has a dual use role both as a decontaminant and a fire extinguisher. The fire fighting properties of ACES are due to the inclusion of ColdFire® and Fire Choke®. ColdFire® (FireFreeze Worldwide, Rockaway, N.J.) is a fire extinguishing agent derived from a variety of plant extracts that combine rapid fire knockdown, a remarkable ability to remove heat, and environmental safety. Studies conducted by FireFreeze in conjunction with the inventors showed that the addition of enzymes and ammonium carbonate buffer to ColdFire® had no negative effects on its ability to extinguish fires. In addition, most of the enzymes incorporated into ACES are significantly stimulated and/or stabilized by ColdFire®. Fire Choke® (Fire Response Systems, Houston, Tex.) is a Class A fire fighting foam that is also a very effective knockdown agent, compatible with the enzymes. It is environmentally safe to use and is also certified for use on military aircraft. The combination of ColdFire® and Fire Choke® gives an extremely potent fire suppressing/extinguishing foam system. Both materials recently have been made available in dry formulations, thus simplifying the production of a single, dry powder system and further improving the logistics benefits. It should be emphasized that for commercial use, the type of foam used (if any) will be the decision of the user. The goal is that the enzymes can function in majority of the major foam systems currently on the market.

In addition to afore-mentioned uses, enzymes could play several other roles in the agricultural and food industry. These could include the cleanup of containers and equipment used in pesticide application as well as the post-harvest washing of fruits and vegetables to remove any trace pesticide contamination.

ACES is intended to eventually replace Decontaminating Solution 2 (DS2), supertropical bleach (STB) and other current decontaminants as either an improvement to the Joint Service Family of Decon Systems (JSFDS) or as part of the Joint Service Superior Decon Solution (JSSDS) Program that was scheduled for production in FY07-08.

EXAMPLES

Example 1

Preparation of the Formulation Preparation—

Dry powder form of OPH and OPAA is first prepared by lyophilization of liquid enzymes in the presence of trehalose sugar (details provided in 2 patents (U.S. Pat. No. 6,469,145 and 6,080,566, incorporated herein in their entirety by reference). The powder could be ground into fine-to-small granulated form using pastel-mortar. Alternatively, a blender could also be used. The powder forms of these enzymes are known to retain catalytic activities for over 2 years, when stored at room temperature. The DFPase enzyme in powder from squid is available from Biocatalytics. The ACES formulation is prepared by manually mixing (pastle-mortar or blender) the components as follows:

a. Add ColdFire/Fire Choke to the enzyme powder.
b. Add DDSAH powder to the mixed material in step a.
c. Add Lysozyme/haloperoxidase enzymes to the mixed material in step b.
d. Add ammonium carbonate to the mixed material in step c.
e. This final mix of components can be mixed with available water before use.

Example 2

Specific Examples of Formulation Application—

The formulation has a wide range of applications in both military and non-military scenarios. The amounts of various components can be adjusted depending on the incidence and the agent suspected to be used (see Table below). Few examples are listed below:

a. Agricultural, pesticide manufacturing/storing industry and food industry—A large number of pesticides are OP-based, which are widely used in agricultural industry. The pesticide residues are often detected on fruits crops after they are harvested. The ACES formulation containing OPH can be effectively used to effectively rid the crops of pesticide residues. The formulation needs to contain only OPH, ColdFire, and ammonium carbonate. Other components, such as foaming agent, biocidal agents and other enzymes need not be used for this application. In addition, the discharge from pesticide manufacturing and storage sites can be treated with this formulation for removal of hazardous material.
b. CB incidence in civilian/military setting—Complete formulation with all the components, including three enzymes, DDSAH, foaming agents, ammonium carbonate will be used in this formulation. As listed in Table 4, ideally, one could use preferred amounts. In addition, optional additive may include Fire Choke® or EcoTru®, listed in Table 5.
c. Large-area decontamination in military conflicts—Aircraft carrier's Countermeasure Wash Down System could be used for decontamination of the entire flight deck (200,000 $ft^2$ or 4.5 acres) with 3" of foam. For such an application, 500 pounds of complete ACES formulation will be needed to achieve decontamination level for continued operations.

Example 3

The formulation of the invention can be used in a spray decontamination apparatus such as a commercial fire extinguisher or other fire-fighting equipment. To do this the reaction contents of the invention are added to a spray/spray apparatus. Water is then added to dissolve the ingredients. After the ingredients are dissolved in the apparatus, the formulation is ready to spray. This procedure also included premixing the ingredients with water and then adding to the apparatus before spraying. The ingredients include Freeze-dried enzyme powder (OPAA, OPH, DFPase), ammonium carbonate, ColdFire® firefighting agent and the pH of the formulation is adjusted to 8.5-8.9.

Current ACES formulation is effective against OP-based pesticides and CW agents. This formulation can be used for large area decontamination, building interior decontamination, fire fighting, spilled clean-up operations, and personnel decontamination.

REFERENCES

Cheng, T.-c. and DeFrank, J. J., "Enzymatic Detoxification of Organophosphorus Compounds," U.S. Pat. Nos. 5,928, 927, 1999 and 6,080,566, 2000.

Cheng, T.-c., Rastogi, V. K., DeFrank, J. J. and Sawiris, G. P., "G-Type Nerve Agent Decontamination by *Alteromonas* Prolidase," in *Enzyme Engineering XIV*, Vol. 864 of the *Annals of the New York Academy of Sciences*, pp. 253-258, 1998

DeFrank, J. J. and Cheng, T.-c., "Purification and Properties of an Organophosphorus Acid Anhydrolase from a Halophilic Bacterial Isolate," *J. Bacteriol.*, Vol. 173, pp. 1938-1943.

DeFrank, J. J. and White, W. E., "Phosphofluoridates: Biological Activity and Biodegradation," in *The Handbook of Environmental Chemistry*, Vol. 3, Part N, *Organofluorines* (Neilson, A. H., ed), Springer-Verlag, Heidelberg, pp. 295-343, 2002.

Hartleib, J. and Rüterjans, H., "High-Yield Expression, Purification, and Characterization of the Recombinant Diisopropylfluorophosphatase from *Loligo vulgaris,*" *Prot. Expr. Purif.* Vol. 21, pp. 210-219, 2001

Harvey, S. P., "Effects of Detergents, Foams, and Quaternary Ammonium and Phosphonium Compounds on HD Dechlorination Rate," U.S. Army Edgewood Chemical Biological Center, ECBC-TR-021, 1999.

Harvey, S. P., Cheng, T.-c. and DeFrank, J. J., "VX Inhibition Studies of the OPAA Enzyme," U.S. Army Edgewood Chemical Biological Center, ECBC-TR-075, March 2000.

Harvey, S. P., "Enzymatic Degradation of HD," U.S. Army Edgewood Chemical Biological Center, ECBC-TR-220, 2001

Mazur, A., "An Enzyme in Animal Tissues Capable of Hydrolyzing the Phosphorus-Fluorine Bond of Alkyl Fluorophosphates," *J. Biol. Chem.*, Vol. 164, pp. 271-289, 1946.

Omburo, G. A., Kuo, J. M., Mullins, L. S. and Raushel, R. M., "Characterization of the Zinc Binding Site of Bacterial Phosphotriesterase," *J. Biol. Chem.*, Vol. 267, pp. 13278-13283, 1992.

Rastogi, V. K., DeFrank, J. J., Cheng, T.-c. and Wild, J. R., "Enzymatic Hydrolysis of Russian VX by Organophosphorus Hydrolase," *Biochem. Biophys. Res. Commun.*, Vol. 241, pp. 294-296, 1997.

Schuch, R., Nelson, D. and Fischetti, V. A., "A Bacteriolytic Agent that Detects and Kills *Bacillus anthracis,*" *Nature*, Vol. 418, pp. 884-889, 2002.

What is claimed is:

1. A non-corrosive, non-caustic, and non-flammable decontaminant comprising dry powder components in an aqueous solution, said solution comprising:

(a) OPH enzyme in an amount of 0.1-0.5 g/L;

(b) OPAA enzyme in an amount of 0.01-0.05 g/L;

(c) DFPase enzyme in an amount of 0.01-0.05 g/L;

(d) dehalogenase enzyme in an amount of about 1 g/L;

(e) quaternary ammonium salt in an amount of 0.5-1.0 g/L; and (f) a pH control reagent in an amount of 5-25 g/L.

2. The decontaminant of claim 1, further comprising a firefighting foaming agent in an amount of about 0.1 g/L.

3. The decontaminant of claim 2, further comprising a firefighting agent in an amount of about 3 g/L.

4. The decontaminant of claim 1, wherein said dry powder components comprise granulated powders less than about 5 mm in size.

5. The decontaminant of claim 1, wherein said pH control reagent comprises ammonium carbonate.

6. The decontaminant of claim 5, wherein said ammonium carbonate is present in an amount of about 5 g/L.

7. The decontaminant of claim 5, wherein said decontaminant is for decontaminating non-human surfaces and said ammonium carbonate is present in an amount of about 25 g/L.

8. The decontaminant of claim 1, wherein said enzymes are first prepared by lyophilization of liquid enzymes in the presence of trehalose sugar and ground to a powder form.

9. The decontaminant of claim 1, wherein said pH control reagent is added to adjust the pH of said decontaminant in use to 8.5-9.9.

10. The decontaminant of claim 1, wherein said quaternary ammonium salt is dodecyldimethyl (3-sulfopropyl) ammonium hydroxide.

11. The decontaminant of claim 1, wherein said dehalogenase enzyme is *Rhodococcus* dehalogenase enzyme.

12. The decontaminant of claim 1, further comprising one or more additives selected from the group consisting of haloperoxidase lysozyme, aqueous detergents, dry detergents, odor removal compositions, solvents, and hand washing solution.

* * * * *